United States Patent Office 3,761,296
Patented Sept. 25, 1973

3,761,296
PROCESS FOR PREPARING BITUMINOUS
MIXTURES
Emile Muntzer and Paul Muntzer, Strasbourg, France, assignors to Firma Wibau Westdeutsche Industrie- und Strassenbau Maschinen-Gesellschaft mbH, Rothenbergen, Germany
No Drawing. Continuation-in-part of abandoned application Ser. No. 108,566, Jan. 21, 1971. This application July 12, 1971, Ser. No. 161,903
Int. Cl. C08h 13/00, 17/10; C09d 3/24
U.S. Cl. 106—283  25 Claims

ABSTRACT OF THE DISCLOSURE

The present method improves the adhesiveness between bituminous binder components and the mineral components of so called bituminous mixtures by adding to the mineral components a quantity of finely grained or powderized chromite, preferably in the form of chrome alum. The chromite may be added either prior to or simultaneously with or after the addition of the bituminous binder. The foregoing method can be further improved by mixing the moisture sensitive chromites with components which will absorb the moisture of the chromites to keep the chromite in granulation and thus most effective for improving the adhesiveness.

BACKGROUND OF THE INVENTION

The present application is a continuation-in-part application of our copending application Ser. No. 108,566, filed Jan. 21, 1971, now abandoned.

The present application relates to mixtures of mineral aggregates and bitumen especially asphalt. More specifically, the invention improves the adhesivness between the bitumen which acts as a binder between the particles of the mineral aggregate to form so called bituminous mixtures of which the components, especially the mineral components still include at the time of mixing a remnant water or moisture proportion which impairs the adhesiveness between the bituminous components and the mineral components as well as the workability of the mixed product.

Conventionally it is the practice to prepare the bituminous materials by processing the binder components in a hot, liquid, or molten state and to heat the mineral substances prior to the mixing with the binder component in order to dry the mineral components prior to said mixing. Other methods are known in which the heating of the mixture is performed after the addition of the binder components to the undried and cold mineral substances or components.

In both of the above methods it happens that the mixture comprises, even after the heating, a remnant moisture or water content mostly due to incomplete drying, whereby said moisture content exceeds the limits which are permissible for assuring a good adhesiveness between the mineral components and the binder components. As a result, the adhesivness of the bituminous binder film on the surface of the mineral particles is impaired by the presence of a moisture or water film on the mineral particles. Such moisture or water film, although it is very thin, has the effect that the binder component film may relatively easily be pulled off from the surface of the solid mineral substance, for example, when further processing the mixture. However, in particle it is the aim to achieve the best possible adhesive strength between the binder component film and the solid components. Therefore, the separation or peeling of the binder component as a result of remnant moisture or water is a rather undesirable disadvantage.

A further disadvantage of the prior art which results due to the presence of said remnant water or moisture is seen that the bituminous mass or mixture has a consistency which is, due to the lubricating effect of the water film, more flowable than would normally be expected on the basis of the composition of the mineral and binder components if no remnant water is present in the mixture.

Another disadvantage is seen in the known effect that molten bituminous binder substances tend to foam in the presence of water, that is, the water is either completely or partially vaporized by the temperature of the binder means and eventually also by the surface temperature of the minerals. However, the water vapor cannot quickly penetrate the binder material coating or film so that between the surface of the solid components and the binder components gas bubbles are produced resulting in said foaming. This phenomenon or rather these gas bubbles also change the consistency or the flowability characteristics of the bituminous mass as well as the adhesiveness of the binder means.

OBJECTS OF THE INVENTION

In view of the foregoing, the invention aims at achieving the following objects, singly or in combination:

To remove the above outlined drawbacks of the prior art and to provide improved bituminous mixtures;

To increase in bituminous mixtures the adhesiveness between the bituminous binder component and the granules of the mineral components;

To provide means for removing so called remnant water or moisture so that such water or moisture will not impair or impede the formation of a strong bond between the binder and the mineral granules;

To eliminate the negative effect of the presence of remnant water or moisture, especially the formation of gas bubbles between the binder and the mineral granule surface;

To provide means which will assure that the flowability or consistency of the final mixture is more predictable than heretofore;

To admix powderized chromite, including water soluble chromites, to the mixtures;

To avoid the agglomeration of the chromite particles which may result, for example, from a high air humidity;

To assure that a proper dosage of the chromite is uniformly available throughout the mixture;

To assure a homogeneous mixture; and

To select a combination of powderized components for the mixture which, upon contact with the water for solving the chromites, form an emulsion like suspension and which also keep stable any water-non-soluble components, such as foaming inhibitors, in the emulsion or suspension state.

SUMMARY OF THE INVENTION

The above objects have been achieved according to the invention by admixing to the mineral components which still comprise remnant moisture or water, a quantity of preferably water soluble chromite in a fine grain or powderized form and ranging from 0.01 to 0.1 percent by weight of the total mineral components. Such admixing may be done either prior, during or subsequent to the addition of the binder components, whereby the chromites are preferably either wholly or partially chrome alums. Further, the mixture is heated as far as is necessary to assure a proper coating.

According to the invention there is further provided mixing the moisture sensitive chromites with moisture absorbing means such as colloidal bentonites or vegetable flours which are swellable in water, or alkalies whereby these components absorb the moisture of the chromites and adding the resulting mixture in predetermined amounts to the moist mineral components. Said resulting mixture which will be referred to as the preliminary mixture to distinguish it from the end product or mixture comprising also the mineral components as well as the binder components, preferably includes the moisture absorbing means as well as the chromites in separate granulations. The amount of the moisture absorbing means will preferably be in the range of 2.5 to 20% by weight of the weight of chromites.

DETAILED DESCRIPTION INCLUDING EXAMPLES

The bituminous mixtures of the present invention are especially useful in road constructions or similar purposes. However, the invention is not limited to these particular uses.

The term "chromite" or "chromites" as used in the present disclosure is intended to comprise soluble chromium compounds which include the trivalent chromium in the anion. The addition of these chromites to the mineral granules has the surprising result that an adhesion betweeen the binder substances and the surface of the solid substances takes place independently of the water or moisture content which generally ranges from 0.1 to 0.5 percent and may even range to as much as 10 percent by weight of the mineral components. Such independent adhesion is due to the fact that the chromites displace or drive off the water film which envelopes the individual granules, whereby such displacing or driving off takes place before the binder film spreads on the surface of the solid components.

Chrome alums have been found to be especially suitable because they are nonhygroscopic and they are easily handled in a finely grained or powderized form, having a grain size of less than 1 mm., and preferable less than 0.1 mm.

Due to the mentioned displacement of the moisture or water from the surface of the solid component granules, the chromites facilitate the adhesion between the solid components and the binder means, whereby the chromite assumes itself the function of an adhesive. With regard to the question of heating the mixture it should be noted that the required amount of heat will depend on the particular method of preparing the mixture as well as upon the type of the employed binder means. In this connection, the above mentioned two methods should be recalled which disclose two entirely different ways of preparing such mixtures. However, temperatures up to and exceeding 300° C. will normally be employed.

The invention checks or avoids the above mentioned foaming by adding to the powderized trivalent chromites anti-foaming agents which are known per se, such as silicones for example polysiloxane or fatty acids such as wool grease. It has been found that the quantity of such anti-foaming agents should be within the range of 0.025 to 0.1 percent by weight of the chromite quantity, whereby the necessary foaming inhibiting characteristics are achieved for the present purposes.

With regard to the preference among the chromites it has been found that the chrome alums are especially effective, among which again the basic chrome alums are particularly effective in achieving the above outlined objects.

Example 1

20 parts by weight of an alum of chromium potassium are reduced to powder form and mixed with 1 part by weight of a fatty acid for example wool gease which acts as a foaming inhibiting agent. This preliminary mixture is then added to the mineral aggregate either prior, simultaneously, or after the addition of the bitumen which acts as a binder for the aggregate.

Example 2

25 parts by weight of an alum of chromium are intimately mixed with 1 part by weight of anti-foaming agent such as silicone oil for example polysiloxane and this mixture is then added to the mineral aggregate as in Example 1 above.

About 100 grams of the additive set forth in the above examples are admixed to one ton of mineral aggregate. It is surprising that such a small quantity of additives has the very beneficial result of increasing the adhesiveness as explained above and of preventing the bituminous mixture from becoming too liquid so that it has the desired consistency.

Example 3

An especially good adhesiveness between the bitumen and the mineral aggregate is achieved by a preliminary mixture comprising 2.5 to 20 percent bentonites (by weight of the chromites) or 2.5 to 20 percent vegetable flour (by weight of the chromites) such as wheat, rye, or corn flour, 2.5 to 20 percent alkalies (by the weight of the chromites). To these preliminary mixtures the anti-foaming agents may be added in accordance with Examples 1 and 2 above. The anti-foaming agents such as silicone or fatty acids may be in solution for which purpose organic solvents such as mineral oils, for example petroleum turpentine, sorbitol, or castor oil are used.

A preliminary mixture as set forth in Example 3 may be used as a water dispersion or solution whereby it is assured that the anti-foaming agents remain in dispersion in the water or in the solution without any precipitation of the chromites, of the bentonites, or of the vegetable flours.

Example 4

A bituminous mixture according to the invention will comprise fine stone chips 23.5 percent by weight of the mineral components, natural sand 20.0 percent by weight of the mineral components, fine gravel 28.0 percent by weight of the mineral components, gravel 25.5 percent by weight of the mineral components, filler materials 3.0 percent by weight of the mineral components whereby the fine stone chips and the natural sand will have a grain size of about 0 to 2 millimeters (mm.), the fine gravel will have a grain size of 2 to 5 mm., and the gravel will have a grain size of about 5 to 8 mm. To the above mineral components there are added bituminous components such as a bitumen of 100 penetration in the amount of 6.3 percent by weight of the mineral components and adhesiveness improving means as disclosed herein 0.04 percent by weight of the mineral components.

Among the alkalies sodium-bicarbonate ($NaHCO_3$) has been found to be especially suitable for the present purpose whereby again a range of 2.5 to 20 percent of $NaHCO_3$ by weight of the chromites in the preferred range. Sodium bicarbonate has been found to increase the basicity and thus the characteristics of the chromites which cause an increase in the adhesiveness between the mineral and binder components.

Non-hygroscopic salts of the type $NaHCO_3$ are of particular importance since these salts, especially $NaHCO_3$, keep the chromites in separate granulation, in other words, these salts prevent the undesirable agglomeration of the chromite granules. Thus these salts perform a double function, normally they act as a separating vehicle for the chromites and as a carrier for the anti foaming agents. However, in this instance the dispersion of the anti foaming agents in the water solution or dispersion is not stable, contrary to the dispersions comprising bentonites or vegetable flours which assure the stability of the dispersion by preventing a precipitation. Thus, it is preferable to use these alkalies as a dry additive to the moist mineral components.

The further aspect of the invention according to which moisture absorbing means such as bentonites, vegetable flours, and/or alkalies are mixed with the chromites prior to adding this preliminary mixture to the mineral and binder components may also be practiced, if desired, by solving said preliminary mixture in water, however, using the preliminary mixture without preparing a water solution or dispersion thereof is preferable.

The use of the moisture absorbing means such as bentonites or flour having a substantial swelling property, withdraws from the chromites so much water that the chromites certainly remain in the form of separate granules. This has the advantage that the preliminary mixture may be added practically in "dry" condition to the moist mineral components.

Heretofore, the addition of wetting agents has occasionally been necessary where said antifoaming agents such as silicone and/or fatty acids were used. This use to create difficulties because the anti-foaming agents are non-soluble in water whereas the wetting agents are water soluble whereby it was not possible to obtain a homogeneous mixture. The invention now proposes to use a neutral powder such as fly ash or flue dust as a carrier or vehicle for the anti-foaming and wetting agents, whereby the efficiency of the anti-foaming agents is increased in that it is now possible to obtain the desired homogeneity.

A still further advantage is seen in that the chromite may initially be added in granular form which assures an even distribution, and that the chromites are then quickly solved even where said remnant moisture proportion is so small that normally the solution of the chromites would not take place fast enough, except where said chrome alums are used which are solved quickly even with a very low remnant moisture content. Since chrome alums are not readily available and besides, are relatively expensive, this additional aspect has the further advantage that now any chromite may be used for the purposes of this invention, just as effectively as chrome alums. This is especially important in connection with road construction in view of the quantities of bituminous mixtures required for this particular purpose.

A still further advantage of the preliminary mixture of the invention is seen in that the adhesiveness improving characteristics resulting from the chromite addition are maintained even where, due to an excess of chromites, precipitation of the latter may take place. In the light of the above advantages it will be appreciated that the present invention provides a genuine advance in the art. In addition to the production advantages such as the fact that the preliminary mixture may be efficiently kept dry which permits the effective addition of the adhesiveness improving means to the bituminous mixtures, the invention has also achieved economic advantages, namely, that chromites other than chrome alum, which are more readily available and less expensive, may now be used in accordance with the present teachings. Another substantial advance in the art is seen in the fact that the admixing of a dry preliminary mixture eliminates the difficulties which used to be due to the aggresiveness of the liquid mixture relative to the equipment used, especially the dosing equipment with its pumps, valves and so forth.

Although the invention has been described with reference to specific examples, it is to be understood that it is intended to cover all modifications and equivalents within the scope of the appended claims.

Incidentally, the above-mentioned wetting agents could comprise, for example, the compounds known under the trademark "Teepol," having the general formula $$R \cdot CH(O \cdot SO_3Na)CH_3$$

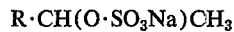

wherein R designates a remainder hydrocarbon with 8 to 13 C-atoms. The proportion of organic solvents and the anti-foaming agents may for example be 85 parts by weight of the solvent to 15 parts by weight of the anti-foaming agents.

What we claim is:

1. In the method in which a bitumen and a mineral aggregate are mixed to form a bituminous mixture of which the mineral aggregate still includes a remnant moisture proportion which impairs said adhesiveness during the mixing as well as the workability of the mixture, the steps for improving the adhesiveness of the bitumen and aggregate in said mixture comprising admixing to the mineral aggregate including said moisture proportion a quantity of a fine grained trivalent chromite which includes trivalent chromium in the anion, said trivalent chromite ranging from 0.01 to 0.1 percent by weight of the total mineral aggregate and heating the mixture sufficiently for coating the mineral aggregate with the bitumen, whereby the trivalent chromite drives out said remnant moisture prior to formation of a binder coating on the surface of the mineral aggregate.

2. The method according to claim 1, wherein all of said trivalent chromite is chrome alum.

3. The method according to claim 1, wherein said trivalent chromite comprises a proportion of chrome alum.

4. The method according to claim 1, wherein said trivalent chromite is admixed to the mineral aggregate prior to adding said bitumen.

5. The method according to claim 1, wherein said trivalent chromite is admixed to the mineral aggregate simultaneously with the addition of said bitumen.

6. The method according to claim 1, wherein said trivalent chromite is admixed to the mineral aggregate subsequently to the addition of the bitumen.

7. The method according to claim 1, further comprising admixing to said trivalent chromite a quantity of foaming inhibiting means ranging from 0.025 to 0.1 percent by weight of the weight of the trivalent chromite.

8. The method according to claim 1, wherein said trivalent chromite is water soluble.

9. The method to claim 1, wherein said trivalent chromite is a basic chromite.

10. The method according to claim 1, wherein said heating involves a temperature of about 70° C. to about 300° C.

11. The method according to claim 1, wherein said finely grained trivalent chromite has a grain size of less than 1 mm.

12. In the method in which a bitumen and a mineral aggregate are mixed to form a bituminous mixture of which the mineral aggregate stlil includes a remnant moisture proportion which impairs said adhesiveness during the mixing as well as the workability of the mixture, the steps for improving the adhesiveness of the bitumen and aggregate in said mixture comprising preparing a preliminary mixture of a fine, grained trivalent chromite which includes the trivalent chromium in the anion ranging from 0.01 to 0.1 percent by weight of the total mineral aggregate and of moisture aborbing means whereby said moisture absorbing means absorb the moisture for maintaining the trivalent chromite in granulation including separate granules, then admixing the preliminary mixture to the mineral aggregate, and heating the mixture sufficiently for coating the mineral aggregate with the bitumen, whereby the trivalent chromite drives out said remnant moisture prior to formation of a binder coating on the surface of the mineral aggregate.

13. The method according to claim 12, wherein said moisture absorbing means are present in a quantity corresponding to 2.5 percent to 20 percent by weight of the trivalent chromites.

14. The method according to claim 13, wherein said moisture absorbing means comprise colloidal bentonites.

15. The method according to claim 13, wherein said moisture absorbing means comprise vegetable flour.

16. The method according to claim 13, wherein said moisture absorbing means comprise alkalies.

17. The method according to claim 12, wherein said trivalent chromite is admixed to the mineral aggregate prior to adding said bitumen.

18. The method according to claim 12, wherein said trivalent chromite is admixed to the mineral aggregate simultaneously with the addition of said bitumen.

19. The method according to claim 12, wherein said trivalent chromite is admixed to the mineral aggregate subsequently to the addition of the bitumen.

20. The method according to claim 16, wherein said alkalies comprise sodium bicarbonate.

21. The method according to claim 12, further comprising admixing to said trivalent chromite a quantity of foaming inhibiting means ranging from 0.025 to 0.1 percent by weight of the weight of the trivalent chromite.

22. The method according to claim 21, wherein said foaming inhibiting means are added as a solution comprising said foaming inhibiting means and an organic solvent for said foaming inhibiting means.

23. A bituminous mixture, comprising mineral aggregate and bitumen as a binder for the mineral aggregate, and fine grained trivalent chromite ranging from 0.01 to 0.1 percent by weight of the total mineral aggregate.

24. The bituminous mixture according to claim 23, further comprising moisture absorbing agents for maintaining the trivalent chromites in granulation.

25. The bituminous mixture according to claim 24, wherein said moisture absorbing agents are present in the amount of 2.5 to 20 percent by weight of the trivalent chromites.

References Cited

UNITED STATES PATENTS

| | | | |
|---|---|---|---|
| 2,714,582 | 8/1955 | Day | 106—277 X |
| 2,782,169 | 2/1957 | Brown et al. | 106—277 X |
| 2,789,919 | 4/1957 | Hardman et al. | 106—277 |
| 2,857,288 | 10/1958 | Albrecht et al. | 106—123 |

FOREIGN PATENTS

| | | | |
|---|---|---|---|
| 695,202 | 8/1953 | Great Britain | 106—280 |

JOSEPH L. SCHOFER, Primary Examiner

J. B. EVANS, Assistant Examiner

U.S. Cl. X.R.

117—27, 71, 92